Aug. 7, 1945.   R. W. BROWN   2,381,393
BRAKE
Filed May 29, 1943   3 Sheets-Sheet 1

INVENTOR
ROY W. BROWN
BY
Ely + Fryz
ATTORNEYS

Aug. 7, 1945.    R. W. BROWN    2,381,393
BRAKE
Filed May 29, 1943    3 Sheets-Sheet 2
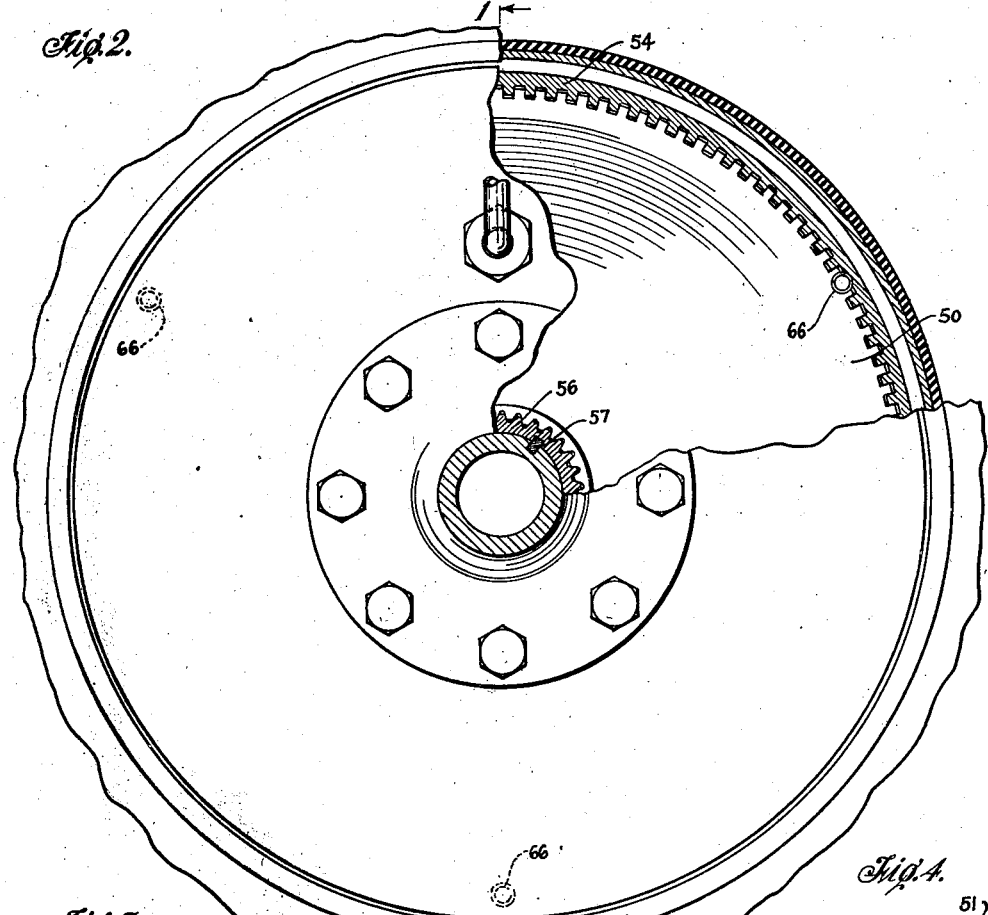
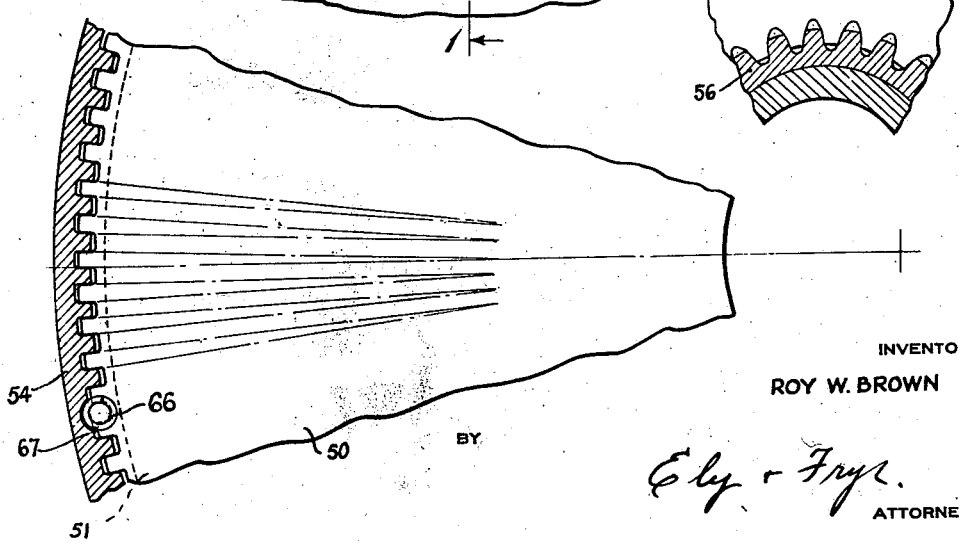
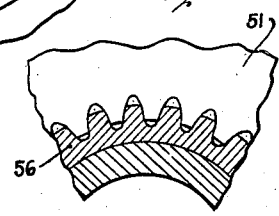
INVENTOR
ROY W. BROWN
BY
Ely + Frye
ATTORNEYS

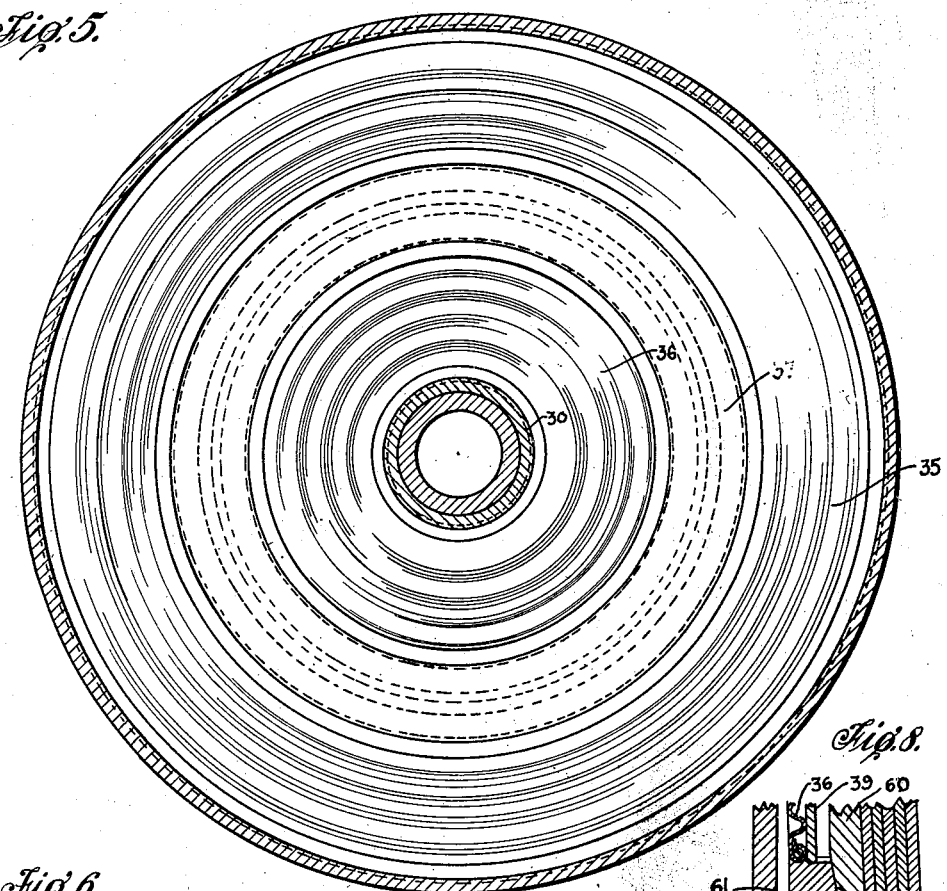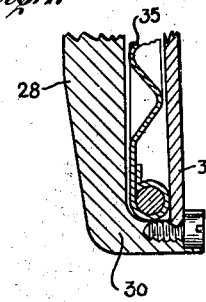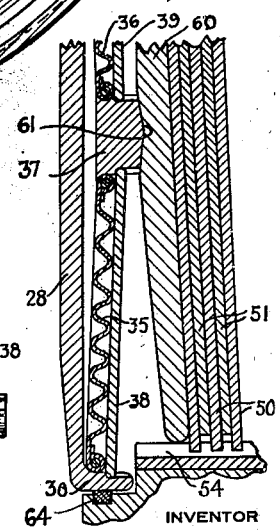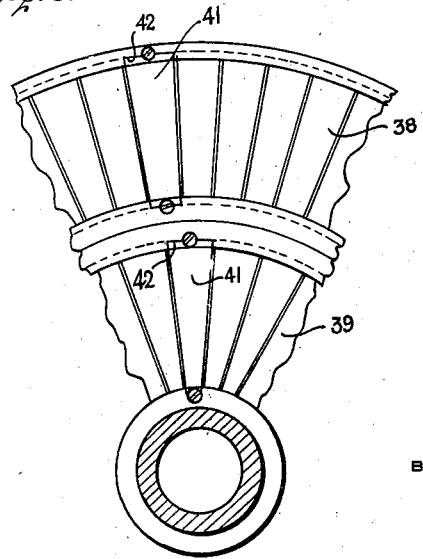

UNITED STATES PATENT OFFICE 2,381,393

BRAKE

Roy W. Brown, Akron, Ohio, assignor to The Firestone Tire & Rubber Company, Akron, Ohio, a corporation of Ohio Application May 29, 1943, Serial No. 488,965

3 Claims. (Cl. 188—18)

This invention relates generally to brakes, and more particularly it relates to fluid operable, disc type, airplane wheel brakes.

It is an object of the invention to provide an improved structural organization in a fluid operable brake of the multiple plate type for the purpose of eliminating warping of the plates during use.

Another object is to provide improved means in a brake of the above type, for the control of frictional engagement between the plates.

Another object is to provide a simple and efficient wheel brake which may be easily disassembled for inspection and repair, and which requires a minimum of space for complete disposition within the hub of a wheel.

A further object is to provide improved mounting means for the brake plates whereby to facilitate torque distribution between one set of plates and the wheel, and torque distribution between the other set of plates and the axle during operation of the device.

A further object is to devise a multiple disc brake operating means comprising a sealed expansible chamber including a corrugated or convoluted deformable diaphragm.

The foregoing and other objects, particularly with reference to brakes for airplane landing wheels, will become apparent to persons skilled in the art upon an examination of the specification and drawings, wherein:

Fig. 2 is a view along line 2—2, Fig. 1;

Figs. 3 and 4 are fragmentary details showing the manner in which the outer and inner margins of the plates are splined;

Fig. 5 is taken along line 5—5, Fig. 1;

Fig. 6 is a fragmentary detail of the diaphragm retaining assembly and is taken from the plate assembly side of the diaphragm;

Fig. 7 shows in enlarged section the anchorage of the diaphragm margin; and

Fig. 8 is a fragmentary detail in section illustrating the relative position of the components of the brake when they have been actuated into braking position.

Like parts are identified by the same reference characters throughout the drawings and specification.

Figure 1:
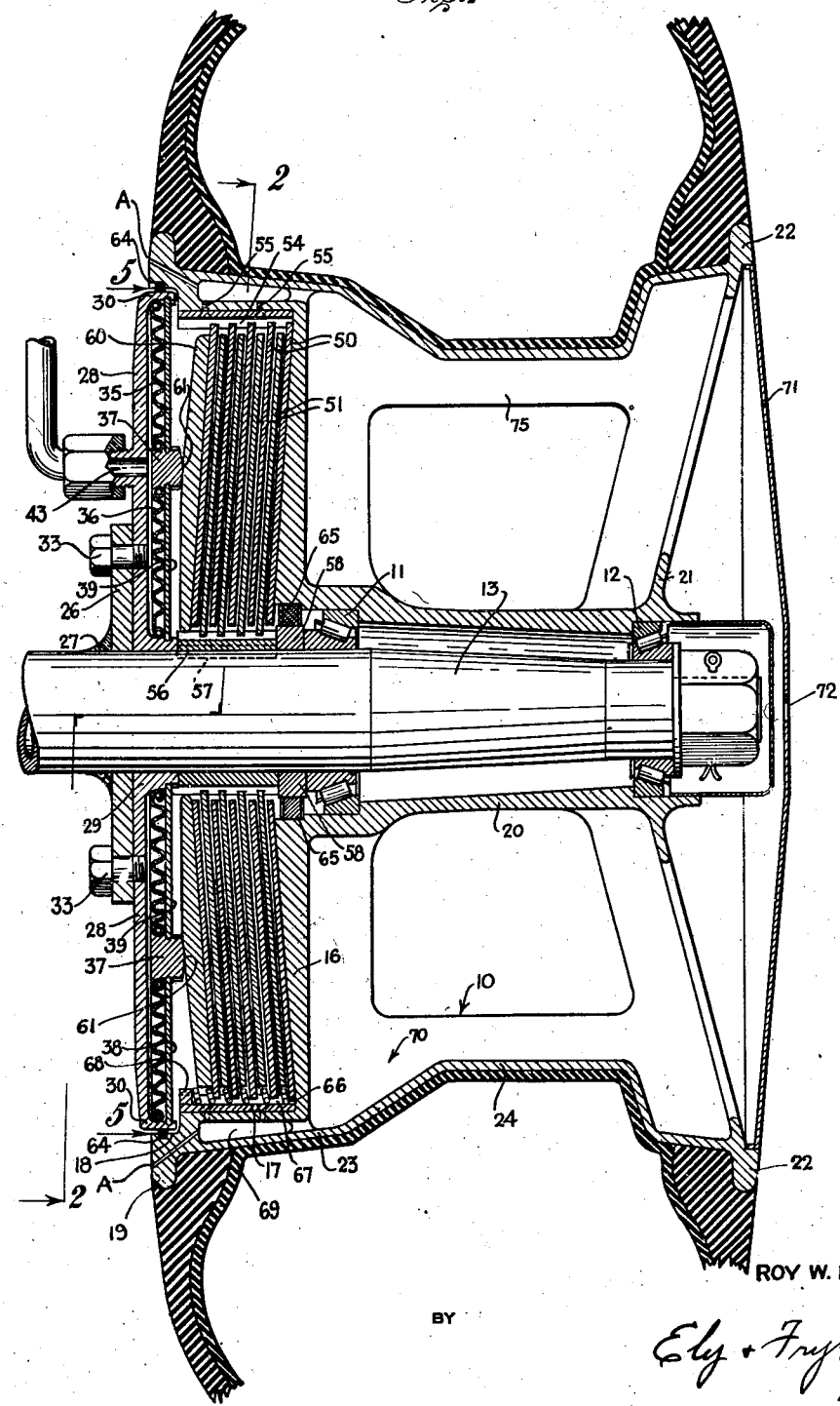
Fig. 1 is a section in an axial plane through an airplane wheel incorporating the present invention.

Referring to Fig. 1, an airplane type wheel 10 is internally provided with bearings 11 and 12 for rotation about a stationary axle 13, fastened to a landing gear, not shown. Wheel 10 includes inner walls 16, 17 and 18 forming a chamber or brake housing to receive the brake mechanism later described. The wheel is provided with an inner bead engaging flange or rim 19, a central portion 20, an outer bead engaging rim 22, and a tire engaging wall 23 having an axially off-set dished portion 24 forming the tire well.

Axle 13 carries a flange 26, welded thereto at 27, for the support of an annular backing plate 28, having a flanged inner margin 29 and a flanged outer margin 30. Wall 28 is clamped to flange 26 by cap screws 33. Plate 28 provides a closure for the brake mechanism chamber and also provides support means for a fluid responsive brake actuating device hereinafter described.

The brake actuating device comprises a pair of concentric, annular corrugated or convoluted metal diaphragms 35 and 36, a ring 37, and two sets of radially disposed ring positioning segments 38 and 39, the segments of each set being disposed in circumferential series. Segments 38 marginally engage flange 30 and ring 37 respectively, while segments 39 marginally engage flange 29 and ring 37. The inner walls of the closure plate flanges and the sidewalls of ring 37 are provided with annular grooves for reception of the segment margins in loose fit engagement therewith. The segments may be easily installed or removed at a circumferential point wherein flanges 29, 30 and ring 37 are marginally channeled to allow the segments to be inserted therebetween. A retainer plate 41 is removably attached by means of grooves 42 to cover the channeled opening above described, whereby to normally constrain the plates against removal. The respective margins of diaphragms 35 and 36 are clamped, welded, or brazed to the adjacent sidewall portions respectively of flanges 29 and 30 and ring 37 to provide sealed expansible chamber. A fluid inlet passage 43 connects the space intermediate the diaphragm assembly and plate 28 with a source of fluid under pressure.

Within the brake mechanism chamber two sets of alternately disposed brake discs or plates, 50 and 51, respectively, are disposed in axially slidable relation. The plates of each set are frustoconical and provided with a circular central aperture, the plates being of identical taper for complementary engagement. Plates 50 have their outer margins engaged in straight-sided splined relation to an annular member 54, carried by chamber wall 17, and secured thereto by screws 55. The splined relationship between the periphery of disc 50 and member 54 is illustrated in Figure 3, in which the construction lines indicate that the sides of the teeth in member 54 are parallel whereas the sides of the teeth in discs 50 are inclined toward each other in the direction radially inwardly toward the center of the discs. In the spaces between the respective splines in member 54 and in discs 50, clearances are provided for radial movement of the discs with respect to member 54. By reason of these clearances and the parallel walled relationship between the sides of each respective tooth on member 54, discs 50 may readily expand under action of heat developed by frictional braking effort, without binding. At the same time the inter-fitting teeth always remain in snug sliding engagement so as to prevent a hammering impact between the respective sets of teeth when the brake pressure is alternately applied and released. Such hammering action is found to result when lost motion is allowed, and especially when a small number of splines are employed. The present invention, in employing a continuous series of splined teeth about plate 50 and member 54 distributes stresses therebetween over a large area.

As illustrated in Figure 4 a different type of spline is employed in the inter-engagement between plates 51 and member 56 on the axle. Here in view of the smaller diameter and smaller permissible area of engagement of spline teeth, with a consequently higher concentration of stresses, a spline must be provided which will afford a minimum concentration of stress at the root of the spline teeth. It has been found that an involute toothed spline will accomplish this result. This type of spline is further permissible on the inner circumference of the brake disc as this portion of the disc is not substantially affected by the expansion under action of heat developed by frictional braking effort. Sleeve 56 is keyed at 57 against rotation about axle 13 and having its ends abutting flange 29 and a ring 58 respectively to prevent axial movement thereof. The purpose of employing involute splines between the plates 51 and their mounting member is, of course, to minimize torque stress concentration at the root of the spline. A 30° involute spline is satisfactory. Plates 51 are, of course, held stationary with axle 13 while plates 50 rotate with wheel 10. A pressure distributing plate 60 is interposed between ring 37 and the adjacent plate 50 of the rotatable set. Plate 60 is of substantial weight as compared to an individual brake plate as clearly shown in cross section, Fig. 1. The plate 60 is provided with an annular notch 61 intermediate the margins thereof for engagement by a ribbed end wall of ring 37. The pressure plate 60 is both axially and rotatably movable in respect to sleeve 56 upon which it is mounted.

A sealing gasket 64 is carried by chamber wall 18 for engagement with the periphery of flange 30 to protect the brake mechanism from the elements while allowing rotation between the hub and axle. An annular seal 65 is supported on ring 58 for engagement with the inner wall of hub 20 to confine grease about bearing 11 and prevent entry of the grease into the brake chamber.

The brake plates 50, 51 normally are held in a disengaged position by helical springs 66, preferably three in number and equally distributed circumferentially of the plates. The member 54 is recessed at three points to provide channels, such as the channel 67, for receiving the springs 66. Springs are preferably maintained under slight compression between a stop 68 and inner wall 16 of the brake chamber. The outer margins of plates 50 are received intermediate adjacent convolutions of springs 66 whereby to effect equal spacing of the plates 50 intermediate plates 51, the respective plate sets being self-adjusting to a disengaged position upon release of the diaphragm-actuating pressure.

To facilitate cooling of the brake chamber walls and particularly for the purpose of lowering the temperature of the bead rim 19, integrally connected thereto, air outlet ports A are provided to extend from the hub interior, through the rim, to the hub exterior. Chamber wall 17 is spaced from the wall 23 to provide a chamber 69 leading into the hub interior 70. Hub cap 71, maintained in pressed fit relation to the outer bead rim 22, is provided with a central aperture 72 through which atmospheric air is drawn during rotation of the wheel by reason of the suction created by the wheel webbing 75 and the apertured wall 21. The incoming air circulates about chamber walls 16 and 17 to pass through chamber 69 and through ports A to discharge into the atmosphere, a considerable amount of heat being withdrawn from the chamber walls during such circulation.

Operation of the device is as follows: Fluid under pressure, introduced through inlet 43, actuates the diaphragm assembly including ring 37, see Fig. 8. Plate 60, engaged with ring 37, is thereby pressed axially toward the brake plates to compress them into frictional engagement for braking action between the axle and wheel. It will be noted that the plates engage pregressively, from left to right as viewed in Fig. 1, during each braking operation. Upon release of the fluid pressure, spring 66 returns the plates to a position of nonengagement, and resilient diaphragms 35 and 36 contract to their unstressed condition to return ring 37 to the position in Fig. 1.

I have found that the novel organization herein taught is productive of a brake and hub assembly requiring a minimum of attention and with almost complete elimination of plate warping during use.

While but one embodiment of the invention has been illustrated, it is not my intention to limit the scope of the invention to that particular embodiment, or otherwise than by the prior art and the scope of the appended claims.

I claim:

1. A wheel and brake assembly having in combination, a fixed axle, a drum-like wheel rotatable thereon, said wheel being provided with a chamber opening laterally thereof, two sets of annular frusto-conical plates disposed in alternation within the chamber, one of said sets having outer plate margins in splined engagement with the wall of the chamber, the other set having inner margins in splined engagement with the axle, a closure plate for said chamber fixed to the axle and having an outer margin engaging the wheel in sealing relation therewith while allowing relative rotation therebetween, said plate having marginal flanges inwardly turned for disposition within the chamber, a fluid responsive device within the chamber and mounted on said closure plate, said device comprising a pair of concentrically disposed annular diaphragms and an intervening pressure ring, means maintaining said diaphragms in fluid sealing relation to said ring and to said pressure plate, said plate provided with a fluid inlet leading to the space between the diaphragms and closure plate, a plurality of retainer plates disposed in circumferential series and having inner and outer margins pivotally engaging the pressure ring and one of the closure plate flanges respectively, a pressure distributing member having one side contacting the outermost plate of said sets and provided at the opposite side with a depression for engagement of a lateral portion of said pressure ring, spring means for maintaining the sets of plates normally disengaged, the plates of one set being adapted to frictionally engage the plates of the other set against the urge of said spring upon application of fluid pressure through said inlet to said diaphragms and pressure rings.

2. A wheel hub and multiple disc brake assembly having in combination, a fixed axle, a generally drum shaped wheel rotatable thereon, said wheel being interiorly provided with a laterally disposed brake housing, two sets of brake discs or plates disposed in alternation within the housing, one set of plates having outer margins in splined relation to the wall of said housing, the other set having inner margins in splined relation to the axle, an annular backing plate intervening between the axle and wheel to provide a closure for the brake housing, said member having inner and outer marginal flanges, a bellows-like brake-actuating device carried by said annular backing plate and comprising a pair of concentric annular resilient diaphragms, a pressure ring disposed between said annular diaphragms, and having sealing engagement with the adjacent margins thereof, the outer diaphragm having its periphery in fluid sealing relation to the outer plate flange and the inner circumference of the inner diaphragm in fluid sealing relation to the inner plate flange to provide an expansible chamber, and two sets of retaining plates for backing up said diaphragms and having margins pivotally engaging the pressure ring, said backing plate being provided with a fluid inlet to the space between the inner wall of said plate and the diaphragms and pressure ring for expanding said diaphragms to urge the ring away from the backing plate, and an annular pressure disc interposed between the pressure ring and the sets of brake plates, whereby upon application of fluid pressure to said expansible chamber, the pressure ring axially displaces the pressure disc to force the brake plates of one set into frictional engagement with the brake plates of the other set to effect braking action between axle and wheel.

3. A wheel and brake assembly having in combination, a fixed axle, a drum-like wheel rotatable thereon, said wheel being provided with a chamber opening laterally thereof, two intercalated sets of annular frusto-conical plates within said chamber, one of said sets having outer plate margins in splined engagement with the wall of the chamber, the other set having inner margins in splined engagement with the axle, a closure plate for said chamber fixed to the axle and having an outer margin engaging the wheel in sealing relation therewith while allowing relative rotation therebetween, a fluid responsive device in the form of a bellows within the chamber, said device being operatively connected to one of the plates for the actuation of one set of plates into and out of frictional engagement with the other set of frusto-conical plates, said device comprising a pair of concentrically disposed annular diaphragms and an intervening pressure ring, means maintaining said diaphragms in fluid sealing relation to said ring and to said pressure plate, said plate provided with a fluid inlet leading to the space between the diaphragms and closure plate, a plurality of retainer plates disposed in circumferential series and having inner and outer margins pivotally engaging the pressure ring and one of the closure plate flanges respectively, a pressure distributing member having one side contacting the outermost plate of said sets and provided at the opposite side with a depression for engagement of a lateral portion of said pressure ring, spring means for maintaining the sets of plates normally disengaged, the plates of one set being adapted to frictionally engage the plates of the other set against the urge of said spring upon application of fluid pressure through said inlet to said diaphragms and pressure rings.

ROY W. BROWN.